United States Patent
Lemme

Patent Number: 5,809,402
Date of Patent: Sep. 15, 1998

[54] ACARS/VHF TRANSCEIVER INTERFACE UNIT (AVIU)

[75] Inventor: Peter W. Lemme, Kirkland, Wash.

[73] Assignee: The Boeing Company, Seattle, Wash.

[21] Appl. No.: 711,385

[22] Filed: Sep. 6, 1996

Related U.S. Application Data

[63] Continuation of Ser. No. 255,594, Jun. 8, 1994, abandoned, which is a continuation-in-part of Ser. No. 957,972, Oct. 7, 1992, abandoned.

[51] Int. Cl.⁶ .................................................. H04B 1/40
[52] U.S. Cl. ................................ 455/73; 455/78; 455/88
[58] Field of Search .................................. 455/73, 74, 78, 455/88, 54.1, 58.1, 58.2, 38.2, 517, 527, 528

[56] References Cited

U.S. PATENT DOCUMENTS

| | | | |
|---|---|---|---|
| 2,616,973 | 11/1952 | Mantz | 179/2 |
| 2,795,649 | 6/1957 | Carter | 179/2.5 |
| 4,494,244 | 1/1985 | Arndt et al. | 455/78 |
| 4,551,854 | 11/1985 | Rutty et al. | 455/78 |
| 4,642,775 | 2/1987 | Cline et al. | 364/443 |
| 4,675,675 | 6/1987 | Corwin et al. | 340/945 |
| 4,788,531 | 11/1988 | Corwin et al. | 340/945 |
| 4,809,297 | 2/1989 | Polansky et al. | 375/7 |
| 4,932,071 | 6/1990 | Arndt et al. | 455/58 |
| 4,943,919 | 7/1990 | Aslin et al. | 364/424.03 |
| 4,989,203 | 1/1991 | Phinney | 370/85.13 |
| 5,046,130 | 9/1991 | Hall et al. | 455/78 |
| 5,063,610 | 11/1991 | Alwadish | 455/45 |
| 5,249,302 | 9/1993 | Metroka et al. | 455/11.1 |

FOREIGN PATENT DOCUMENTS 213024   2/1990   Japan .

Primary Examiner—Nguyen Vo
Assistant Examiner—Lee Nguyen
Attorney, Agent, or Firm—Conrad O. Gardner

[57] ABSTRACT

An Aircraft Communication, Addressing, and Reporting System (ACARS) to VHF transceiver interface unit (AVIU) which allows direct pilot control of the VHF mode (voice or data) and also commands the ACARS into the proper mode.

1 Claim, 3 Drawing Sheets

ACARS/VHF TRANSCEIVER INTERFACE UNIT (AVIU)

RELATED APPLICATIONS

This is a continuation of application Ser. No. 08/255,594, filed Jun. 8, 1994, now abandoned, which is a continuation in part application of application Ser. No. 07/957,972, filed Oct. 7, 1992, also assigned to The Boeing Company, now abandoned.

BACKGROUND OF INVENTION

1. Field of the Invention

This invention relates to multi-purpose radio systems, and more particularly to an interface (AVIU) between an aircraft communication, addressing and reporting system (ACARS) and VHF transceiver.

2. Problem Statement

The interface between the ARINC 724/724B Aircraft Communication, Addressing, and Reporting System (ACARS) management unit (MU) and the ARINC 716 VHF transceiver includes two discrete analog signals. The port select discrete is used by the ACARS to command the VHF radio to use the ACARS-provided tuning information (Transmitted from the ACARS using a digital ARINC 429 data bus). The selection of the ACARS tuning is made when the radio detects a path-to-ground on the port select discrete. The voice/data discrete is used by the ACARS to command the VHF radio to use the ACARS-provided audio signal when the ACARS-provided keyline is "closed." The selection of ACARS keying is made when the radio detects a path-to-ground on the voice/data discrete.

The use of ACARS discretes to control transmission and tuning in effect makes the VHF radio an extension of the ACARS, ACARS software is certificated to the DO-178A level 3, non-essential. ACARS is considered non-essential equipment. The VHF radio systems are certificated as essential equipment. The connection of ACARS in the manner described above degrades the VHF integrity to that of ACARS, in effect making the radio(s) connected to ACARS non-essential equipment. The FAA has rules that a radio with an interface to ACARS, as described above, may not be used for ATC communication.

PRIOR ART PATENT LITERATURE

Voice/data communication systems are shown in U.S. Pat. No. 5,063,610 to Alwadish and U.S. Pat. No. 2,795,649 to Carter. Multi-voice channels are illustrated in the patent literature in U.S. Pat. No. 2,616,973 to Mantz; U.S. Pat. No. 4,551,854 to Rutty; U.S. Pat. No. 4,494,244 to Arndt; and U.S. Pat. No. 4,932,071 to Arndt. Japanese patent No. 2-13024 is illustrative of the use of two data circuits on the same channel.

U.S. Pat. No. 5,046,130 issued to Hall, et. al. shows a device which is primarily developed to automate the reporting of position via a radio link. Hall, et. al. shows the utilization of a radio for both voice and data communications. In one configuration, if the user chooses to make a voice or data transmission the system can automatically attach a position report (either before or after the user commanded transmission). Hall, et. al. provides for several other means of transmitting a position report, such as in request to a received poll, or when a timer expires.

In contrast to the present invention Hall, et. al. does not address the concerns of isolating an essential voice transmitter from failures of a data system. Hall, et. al. does not address a means to monitor and control ACARS voice and data modes to ensure consistent mode annunciation's to the pilot commanded VHF transceiver voice or data mode. Hall, et. al. does not address a means to add the above functionality while not modifying the existing ACARS and VHF transceivers.

ACARS is installed to provide data communications capability. In almost all cases, the ACARS is connected to a VHF transceiver that is already utilized for voice communications. Unlike Hall, et. al., there is no case of consecutive voice and data communications over a single frequency. A significant feature of the present invention, the AVIU, is to allow an affected VHF transceiver to be used for essential VHF voice communications while at the same time providing alternate capability for ACARS data communications and also while protecting the VHF voice communications from ACARS failures (accomplished with no internal change to the existing ACARS or VHF system). Hall, et al does not address system safety considerations.

The operator interface to the VHF system is unchanged with the installation of the AVIU compared to the interface prior to installation of the AVIU. There are some exceptions, when no dedicated momentary grounding push button is installed to allow pilot command of a mode change from/to voice from/to data mode. However, the installation of this switch is widespread, and well known. There is nothing unique to installation of the switch.

The operator interface to the ACARS requires access to a control and display unit (CDU). The CDU presents pages of information electronically controlled by the ACARS, and allows pilot selections from these menu pages. It is possible for the ACARS to have a selection in the CDU menu pages that allows the pilot to choose between voice or data mode. However, this selection relies on ACARS directly controlling the voice or data mode of the affected VHF transceiver. To protect the radio from ACARS failures, this feature is overridden by the AVIU (ACARS/VHF transceiver interface unit). The resulting CDU menu page displays will, however, respond to the AVIU, and ultimately display the mode commanded by the AVIU. The AVIU accomplishes this without a requirement to modify the ACARS.

It is not seen how the operator interface of Hall, et. al. is related to the present AVIU. Hall, et. al. uses radios that are primarily used for voice or data communications. The addition of a position report to a voice transmission could be construed as a combined voice/data radio, but only very short data transmissions are allowed in the voice radio, and the voice radio's primary purpose is for voice communications. The VHF radio connect to an AVIU is designed to be used either for voice or data communications, but never at the same time. The operator of Hall, et. al. device does not need to choose modes, one radio is for voice, the other for data. The present AVIU is designed primarily to allow direct pilot control of voice or data mode of the VHF transceiver while automatically commanding the ACARS to voice or data mode to match.

SUMMARY OF THE INVENTION

The ACARS/VHF Interface Unit (AVIU), according to the present invention, provides adequate partitioning between the ACARS MU and the VHF transceiver, such that the radio may be considered for credit as essential equipment. The AVIU provides this partitioning by interrupting the ACARS port select and voice/data discretes and the MIC keyline and audio output signals to the radio, and providing a means of positive pilot control over these discretes and signals. Pilot command of voice or data mode switching utilizes existing capability already provided for in either the VHF radio control panel, the VHF tuning control head, or a dedicated ACARS control panel, depending on the particular installation.

While the AVIU allows for direct pilot control of the VHF mode (voice or data), the AVIU also automatically commands the ACARS into the proper mode. This is accomplished by providing a command into the ACARS remote voice/data input. A momentary ground signal of 50 ms or more will command the ACARS to change either from voice to data mode or data to voice mode. The AVIU monitors the ACARS voice/data analog discrete signal to verify that ACARS has changed to the proper mode. Also, the AVIU will command the ACARS back into the proper mode if the ACARS independently changes mode.

The AVIU must provide control of the radio such that it is improbable that a failure will occur which precludes the pilot from using the radio for voice communication. The AVIU gains this level of integrity by utilization of hardware components only, with no reliance on software. This design approach provides a relatively low-cost means of compliance with FAR 25.1309(b)(2).

DESCRIPTION OF THE PREFERRED EMBODIMENT

Input Signal Conditioning 21

Cockpit Remote Voice/Data Switch 211

Figure 1:
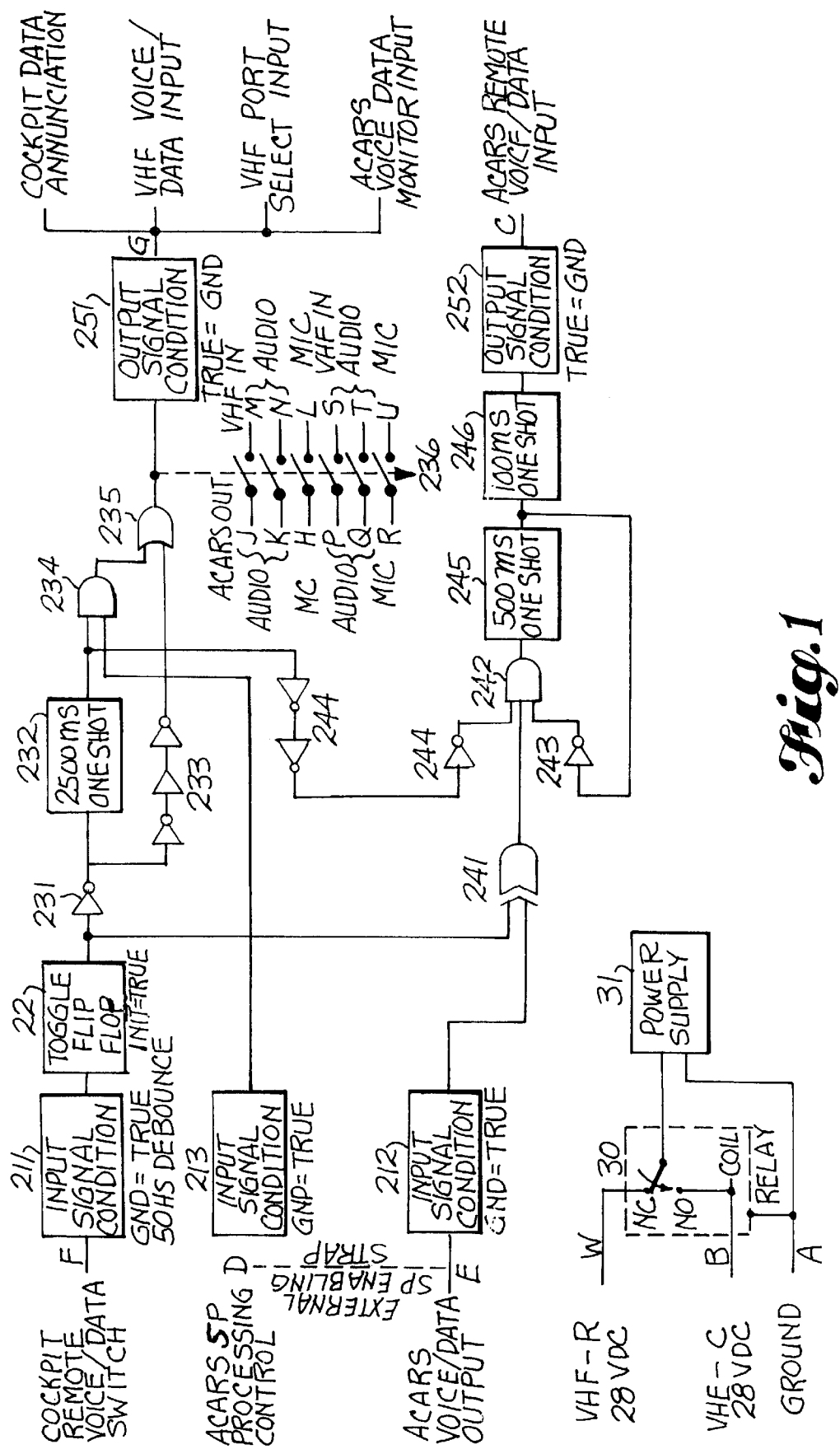
FIG. 1 is a partial schematic and block diagram of the present ACARS/VHF interface unit (AVIU)

Turning to FIG. 1, it can be seen that a push-button switch is provided in the flight deck for use by the flight crew to command the ACARS to change voice/data mode. This push-button, when depressed, provides a path-to-ground. The input signal conditioning on this signal accomplished two requirements: first, the signal from the switch must be "debounced"; second, the analog open/ground state must be converted into a logical signal with electrical characteristics consistent with the logic circuits used throughout the AVIU.

The logically true state shall be determined only when the input provides a path-to-ground continuously for a minimum of 50 ms. The true state shall be maintained until such time the signal has been determined to be in the open state. The logically false state shall be determined whenever the input is not determined to be logically true.

ACARS Voice/Data Output 212

The input signal conditioning of the ACARS voice/data output shall associate the analog signal with the correct logical state, with electrical characteristics consistent with logic circuits used throughout the AVIU. The logically true state shall be determined when the ACARS voice/data output is determined to provide a path-to-ground. The true state, therefore, is determined when the ACARS is in data mode. The logically false state is determined when the ACARS voice/data output is not determined to be true. The false state, therefore, is determined to be voice mode.

ACARS 5P Processing Control 213

The input signal conditioning of the ACARS 5P processing control signal shall associate the analog signal with the correct logical state, with electrical characteristics consistent with logic circuits used throughout the AVIU. The logically true state shall be determined when the ACARS 5P processing control signal is determined to provide a path-to-ground. If this input is left open (false), the AVIU will provide no additional delay in switching from data to voice mode.

Toggle Flip-Flop 22

The momentary true logical state from the Cockpit Remote Voice/Data Switch input signal conditioning hereinbefore described provides the input to a toggle flip-flop. This flip-flop will change state when the input is determined to a rising-edge from false to true. The flip-log output shall change state from either true to false, or from false to true, depending on the initial state. The toggle flip-flop shall power up into the true state. The true state is associated with data mode, and the false state is associated with voice mode. The following truth table depicts the logical operation of the toggle flip-flop:

| $INPUT_{N-1}$ | $INPUT_N$ | $OUTPUT_N$ | $OUTPUT_{N+1}$ |
|---|---|---|---|
| F | F | F | F |
| F | F | T | T |
| F | T | F | T |
| F | T | T | F |
| T | F | F | F |
| T | F | T | T |
| T | T | F | F |
| T | T | T | T |

N−1 is the past state
N is the current state
N+1 is the next state

Voice/Data Mode Logic 23

Logical Inverter 231

This inverter shall convert the output from the toggle flip-flop hereinbefore described into its logically complemented state. If the output of the flip-flop is true, then the inverter shall provide a false signal. If the output of the flip-flop is false, then the inverter shall provide a logically true signal. If the flip-flop has complemented outputs available, then this inverter is not required. The output of this inverter shall be associated with the data mode when false, and the voice mode when true.

2500 ms One-Shot 232

When the output of the Inverter changes from a false state to a true state (data to voice mode), this logic circuit will output a true signal for 2500 ms. This duration may not be retriggered during the 2500 ms true state (additional false to true input state transitions will not extend the duration of the output true state).

This circuit will limit the time provided for the ACARS to transmit the 5P data message when transitioning from data to voice mode. The 2500 ms allows for a 100 ms command to the ACARS to change mode, 400 ms for the ACARS to process the mode change command, and 2000 ms for the ACARS to send the 5P message.

Logical Inverter and Delay 233

These inverters convert the output of the inverter, back to the same logical sense as output from the toggle flip-flop. The output of these inverters may be associated to the data mode while true, and the voice mode while false.

These inverters provide transport delay to account for the time to process through the 2500 ms one-shot. The number of inverters is selected to accommodate the required logical processing and to ensure that the output from the inverters goes to the false state only after the output from the 2500 ms one-shot, has settled into the true state.

AND Gate 234

The AND gate provides a true output when both inputs are true. This gate is used to delay the transition from data mode to voice mode if 5P processing is desired. The delay lasts while the ACARS 5P processing control signal is true for a period of not longer than 2500 ms (as determined by the 2500 ms one-shot).

The delay may be shortened by detection of a false output. This will occur when ACARS successfully transmits the 5P message prior to 2500 ms elapsing since the transition from data mode to voice mode is commanded.

If 5P processing is not enabled, as described in paragraph 213, then the output of this gate provides no delay in transitions form data mode to voice mode.

OR Gate 235

The OR gate provides a true output while either or both inputs are in the true state. While the AND gate output is false, this OR gate will reflect the output as commanded by the toggle flip-flop and delayed by the transport through the Inverters.

If 5P processing is desired, the output of the AND gate is used to hold up the output of the OR gate and effectively delay the transition from data mode to voice mode.

Signal Switches 236

The logically true output of the OR gate shall close six independent switches. Each switch shall be capable of carrying either the MIC Keyline or the AUDIO output signals from either one or two ACARS management units. If the OR gate is logically false, the six switches shall all open up, presenting a minimum of 100,000 ohms of resistance between the contacts.

These switches shall provide additional isolation between the ACARS and the VHF radio.

ACARS Mode Change Command Logic 24

Exclusive OR 241

An exclusive OR gate is true only while either input is true, but not while both inputs are true. In effect, an exclusive OR is true only while both inputs are in different states. This exclusive OR gate compares the output of the toggle flip-flop to the ACARS voice/data output processed. The output of this exclusive OR is true only while the toggle flip-flop is commanding data mode and ACARS is commanding voice mode, or while the toggle flip-flop is commanding voice mode and the ACARS is commanding data mode.

AND Gate 242

The AND gate is true only while all three inputs are true. As long as the AVIU determines there is a mode disagreement, the AND gate will provide a true pulse every 500 ms, except for the 2500 ms after transition from data to voice mode.

Inverter 243

This Inverter provides the logically complemented output of the 500 ms one-shot. If this one-shot provides a complemented output, it may be used in place of this Inverter. This signal is used to provide 500 ms spacing between mode change commands to the ACARS. The 500 ms accounts for a 100 ms command to the ACARS, and 400 ms processing time for the ACARS outputs, to reflect the mode change command. The processing time must be considered to preclude inadvertently commanding ACARS mode changes while ACARS is still processing a mode change. This could cause continuous and never-ending ACARS mode changes.

Inverter and Delay 244

These inverters convert the output from the 2500 ms one-shot to the logically complemented state. If the 2500 ms one-shot provides the complemented output, then one of the inverters may be deleted. The additional inverters are provided for transport delay.

While the logic in 23 is transitioning from data to voice, care must be taken to not provide too many mode change commands to the ACARS. Specifically, the logic in 23 may delay the transition to voice mode for up to 2500 ms after commanded by the pilot. These inverters provide an inhibit, such that only one mode change command is sent to the ACARS during the 2500 ms delay. Without this, it would be possible to inadvertently command the ACARS first to voice mode, then to data mode, and so on.

The transport delay is required to allow processing through gates 241, 242, and 243 prior to the processing through the 2500 ms one-shot 232; otherwise, the initial mode change command could be inhibited. The number of inverters is selected to ensure the processing of the signal through the 2500 ms one-shot occur after the processing through the exclusive ORs and the OR gates 241, 242, and 243, and may be adjusted in consideration of the particular logic circuits selected.

500 ms One-Shot 245

When the output of the AND gate changes from a false state to a true state (detecting mode disagreement between the AVIU and the ACARS), this logic circuit will output a true signal for 500 ms. This duration may not be retriggered during the 500 ms true state (additional false to true input state transitions will not extend the duration of the output true state). This one-shot will provide spacing between mode change commands to the ACARS to provide for ACARS processing.

100 ms One-Shot 246

When the output of the 500s one-shot changes from a false state to a true state, this logic circuit will output a true signal for 100 ms. This duration may not be retriggered during the 100 ms true state (additional false to true input state transitions will not extend the duration of the output true state). This one-shot will provide the logical mode change command to the ACARS of a long enough duration to ensure ACARS will respond to it.

Output Signal Conditioning 25

VHF Mode Command 251

The output of the OR gate shall be converted into an analog signal appropriate to control the VHF radio and to provide a cockpit indication of data mode. In addition, this output is provided directly to the ACARS to assist the ACARS in controlling to the same mode as the VHF radio is commanded. The logically true state (data mode) shall provide a path to ground capable of sinking 1 amp of current at 28 VDC. The logically false state (voice mode) shall provide greater than 100,000 ohms of resistance to ground. The transient characteristics of the analog signal shall provide no greater than 5 ms of rise or fall time to the commanded state.

ACARS Mode Change Command 252

The output from the 100 ms one-shot shall be converted into an analog signal appropriate to control the ACARS remote voice/data input. The logically true state shall provide a path-to-ground capable of sinking 1 amp of current at 28 VDC. The logically false state shall provide greater than 100,000 ohms of resistance to ground. The transient characteristics of the analog signal shall provide no greater than 5 ms rise or fall time to the commanded state.

Power Supply 30

The AVIU shall operate from 28 VDC. Normally, this power shall be provided through the center VHF 28 VDC circuit breaker. If the AVIU is used to control either the center or the right VHF radio, then the AVIU shall accept power through both the center VHF 28 VDC circuit breaker and the right VHF 28 VDC circuit breaker. In this case, the AVIU shall be provided power through the right VHF 28 VDC circuit breaker only when power is not available through the center VHF 28 VDC circuit breaker. The switching between the two power sources may be accomplished either externally to the AVIU or internally to the AVIU. Sufficient capacity shall be provided to allow for continued operation throughout the momentary loss of input power of a minimum of 200 ms. Total loss of power shall ultimately cause all outputs to assume the open state.

Electromagnetic emissions of the AVIU shall comply with DO-160C guidelines for essential equipment.

Failure Detection 40

Wherever possible, failure of the AVIU shall be detected, and all outputs shall be driven to the open state.

Dual VHF Connection 50

The use of the existing ACARS/VHF switching module allows for a single AVIU to control either radio.

Dual ACARS Connection 60

The use of the existing ACARS/VHF switching module allows for a single AVIU to control the master ACARS. Only the ACARS intersystem bus can ensure the standby ACARS assumes the proper state. However, once the standby ACARS is made active, the AVIU will automatically command it to the compliant mode.

ACARS-Initiated Mode Change 70

Only pilot initiate mode changes using the cockpit-provided push-button will cause the AVIU to change the mode the radio is commanded to. If the ACARS attempts to change the mode, either through pilot MCDU action, automatically, or by failure, the AVIU will immediately attempt to command the ACARS back into the proper mode. The AVIU will not change the commanded VHF radio mode in reaction to ACARS-initiated mode changes. If the pilot elects to attempt to directly command the ACARS into a new mode, the AVIU action will defeat the pilot action. This pilot will have to be trained to utilize only the dedicated cockpit push-button for mode changes.

Installation Considerations 80

The AVIU is envisioned to be a small encapsulated module that requires only passive cooling. This module will be bolted onto the aircraft structure nearby the ACARS MU LRU electrical connector. All of the logical signals required are found at the ACARS MU LRU connector. The power wires will have to be separately routed.

The installation provides for external strapping the ACARS 5P processing control signal, if it is desired to be enabled. Left unconnected, the delay in transitioning from data to voice mode will be eliminated.

FIG. 2

Figure 2:
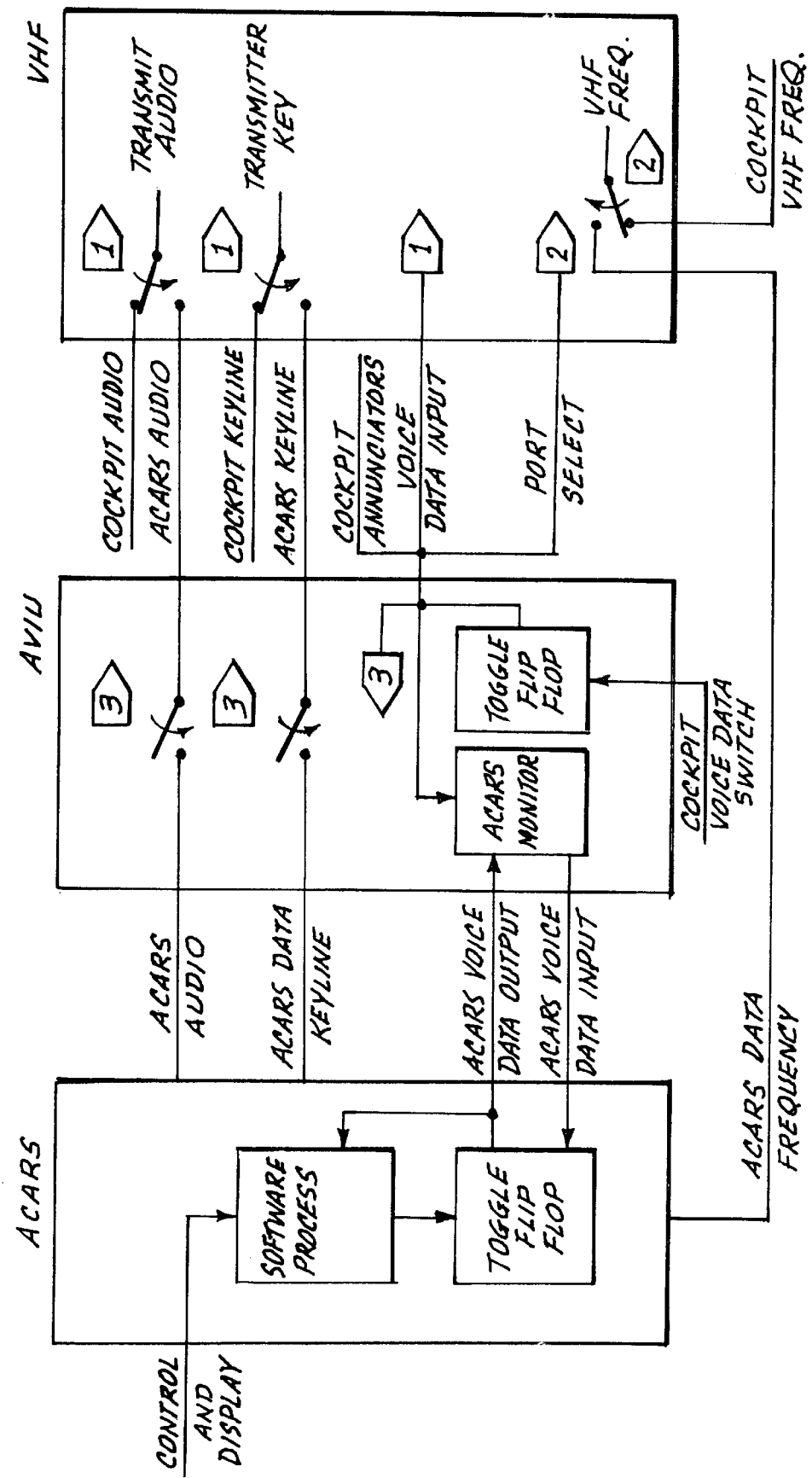
FIG. 2 is a block and partial schematic diagram illustrative of the present ACARS/VHF interface with (AVIU) showing installation as a separate unit and FIG. 3 is a block and partial schematic diagram of an alternative method of interconnection which requires the present ACARS/VHF interface unit (AVIU) function to be absorbed into the ACARS itself rather than a separate unit as the embodiment of FIG. 2.

A representative installation of the AVIU is shown in FIG. 2. This configuration utilizes an AVIU that is installed as a separate unit. The AVIU intercepts the existing wiring between an existing ACARS and VHF radio as shown.

The ACARS utilizes a software process (1) to determine whether to be in voice or data mode. A means to change mode involves inputs to this process from either the ACARS remote voice data input, or through pilot selections on ACARS menus displayed on the external control and display unit. Functionally, the ACARS implements a flip flop (2), alternatively switching between voice and data mode, based on these inputs.

The ACARS audio output provides modulated data to be transmitted by the VHF transceiver. The ACARS data keyline is set when the ACARS audio data is to be transmitted by the VHF transceiver. The ACARS voice data output is set to indicate the current mode of the ACARS.

The AVIU intercepts the ACARS audio and keyline outputs and isolates them from the VHF radio when the AVIU is in voice mode (3). The AVIU toggles between voice and data mode whenever the cockpitvoice data switch is selected (4). The AVIU monitors the ACARS voice data output and compares it to the VHF mode commanded by the AVIU (5). If the ACARS mode disagrees with the VHF mode, the AVIU provides a stimulus on the ACARS voice data input to cause the ACARS to change mode. The AVIU will respond to a disagreement between the ACARS and the VHF radio whenever it is detected.

The VHF radio has a separate cockpit audio and keyline input provided for transmission of pilot voice communications. The VHF radio should select the ACARS audio and keyline inputs only when the AVIU provided voice data input to the VHF radio indicates data mode. When the AVIU is commanding voice, mode, the VHF transceiver should utilize the cockpit audio and keyline inputs (6).

The VHF transceiver has two sources of frequency tuning information, the cockpit and the ACARS. The VHF transceiver selects the ACARS frequency source only when the VHF port select input is set (7).

The AVIU voice data input to the VHF transceiver is also utilized to annunciate the mode of operation in the cockpit (8).

FIG. 3

Figure 3:
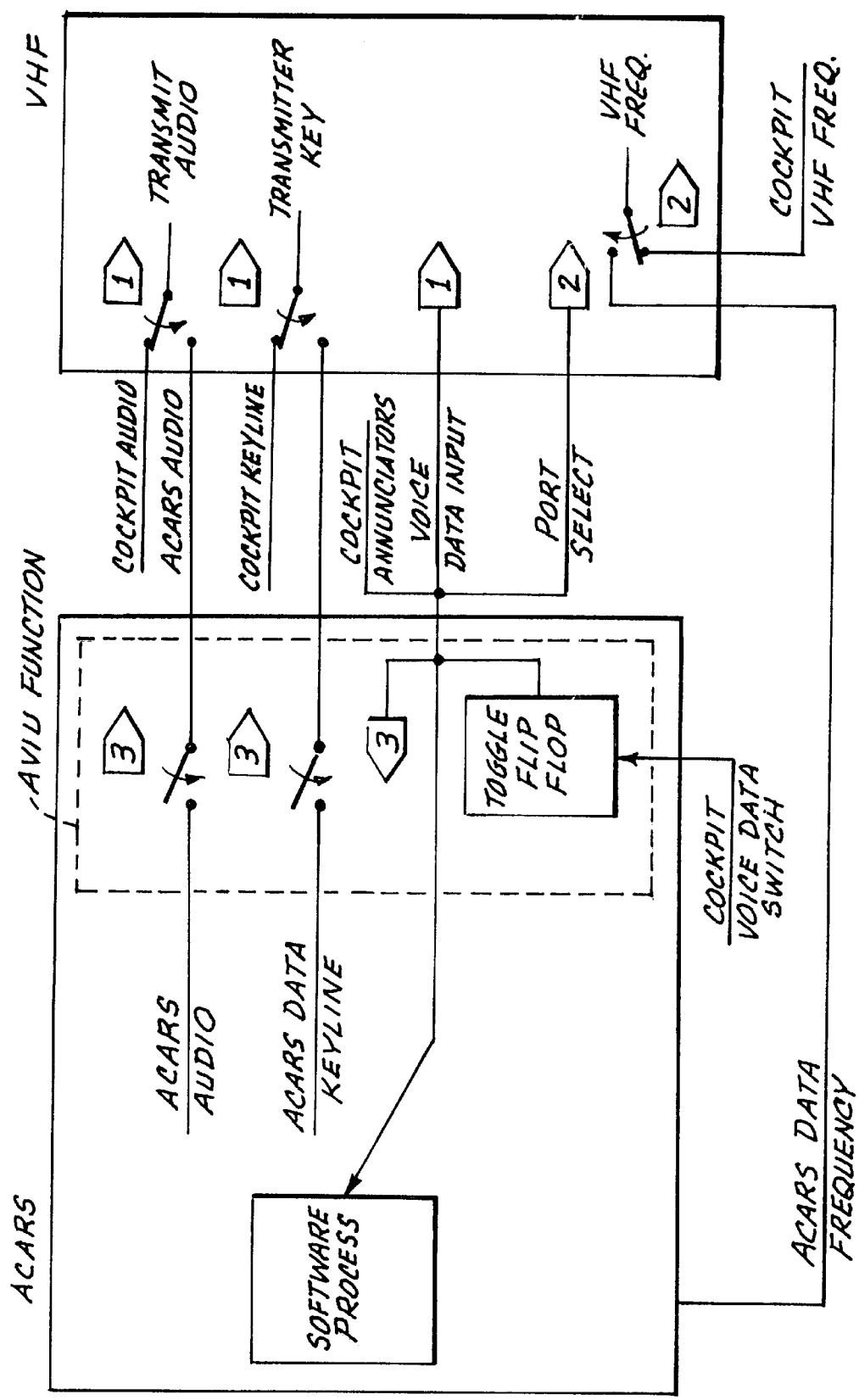

An alternative method of interconnection, shown in FIG. 3, requires the AVIU function to be absorbed into the ACARS itself, rather than a separate unit. This method allows simply replacing the ACARS to introduce the AVIU function, rather than the installation of new, separate unit. In this configuration, the same interconnections are made, except the ACARS encompasses the AVIU function as well.

The AVIU function is identified within the dashed line block shown inside ACARS. In this configuration, the toggle flip flop (1) toggles between voice and data mode in response to commands from the cockpit voice data switch. The ACARS audio and keyline inputs are isolated while in voice mode (2). These functions, and the interface with the VHF radio are identical whether implemented as shown in FIG. 2 or FIG. 3.

In the configuration shown in FIG. 3, the ACARS is itself new. Therefore, rather than implementing the ACARS monitor function, the ACARS software process (4) can be modified to recognize the voice data mode commands from the AVIU toggle flip flop (1) directly. The pilot can no longer select voice or data mode through the control and display unit, and therefore this interface is not required.

From the proceeding, it can be seen that the present ACARS/VHF transceiver interface unit (AVIU) provides for operator control of the VHF transceiver mode of operation based on operator comments to the cockpit voice/data switch. The VHF transceiver is normally used in voice mode, for pilot air-ground communications, but can also be used in data mode, for ACARS data communications. The present system also provides for automatically commanding ACARS mode of operation to coincide with pilot commanded mode of the VHF transceiver. While the ACARS is capable of data communications only in data mode, it can be put into voice mode whereby the ACARS data communications are suspended until ACARS is returned to data mode. This system provides reliable and safe VHF voice communication for Air Traffic Control despite any ACARS malfunction, while alternatively allowing ACARS data communications. The present AVIU also provides a means for monitoring the ACARS voice data mode.

I claim:

1. In combination:

an aircraft communication, addressing and reporting system;

a VHF transceiver;

a cockpit voice/data switch;

an interface unit coupled between said aircraft communication, addressing and reporting system, said cockpit voice/data switch, and said VHF transceiver;

said interface unit including means for the operator control of the said cockpit voice/data switch to provide automatic control of the ACARS mode of operation to coincide with the operator commanded mode of the VHF transceiver without further modification of the ACARS.

* * * * *